(12) United States Patent
Leung

(10) Patent No.: US 8,973,301 B2
(45) Date of Patent: Mar. 10, 2015

(54) ENVIRONMENT-FRIENDLY PLANTING DEVICE WITH AUTOMATIC PERCOLATION AND IRRIGATION OF HERMETIC LIQUID

(76) Inventor: Yiu Tak Leung, Hong Kong (CN)

( * ) Notice: Subject to any disclaimer, the term of this patent is extended or adjusted under 35 U.S.C. 154(b) by 337 days.

(21) Appl. No.: 13/377,563

(22) PCT Filed: Jun. 11, 2010

(86) PCT No.: PCT/CN2010/073794
§ 371 (c)(1),
(2), (4) Date: Dec. 11, 2011

(87) PCT Pub. No.: WO2010/142249
PCT Pub. Date: Dec. 16, 2010

(65) Prior Publication Data
US 2012/0085024 A1    Apr. 12, 2012

(30) Foreign Application Priority Data

Jun. 11, 2009  (CN) ...................... 2009 2 0153312 U

(51) Int. Cl.
| | | |
|---|---|---|
| *A01G 23/10* | (2006.01) | |
| *A01G 31/02* | (2006.01) | |
| *A01G 25/00* | (2006.01) | |
| *A01G 29/00* | (2006.01) | |
| *A01G 27/02* | (2006.01) | |

(52) U.S. Cl.
CPC ................ *A01G 29/00* (2013.01); *A01G 27/02* (2013.01)
USPC .................. 47/65.5; 47/79; 47/48.5; 47/59 R

(58) Field of Classification Search
CPC ......... A01G 9/02; A01G 31/02; A01G 29/00; A01G 27/04; A01G 27/02; A01G 27/003; A01G 27/006; A01G 27/00; A01G 5/04; A01G 9/00; A01G 9/023; A01G 9/025; A01G 9/022; A01G 27/06; A01G 27/005
USPC .......... 47/65, 65.5, 79, 48.5, 81, 80, 65.7, 82, 47/62 E, 59 R, 62 R, 65.9, 66.7
See application file for complete search history.

(56) References Cited

U.S. PATENT DOCUMENTS

| | | | |
|---|---|---|---|
| 3,307,360 A | * | 3/1967 | Bailly .............................. 405/38 |
| 4,117,685 A | * | 10/1978 | Skaife ............................. 405/36 |
| 4,538,377 A | * | 9/1985 | Thornton .................... 47/1.01 R |

(Continued)

FOREIGN PATENT DOCUMENTS

| | | | | |
|---|---|---|---|---|
| WO | WO 81/01580 | * | 11/1980 | ............. E02B 11/00 |
| WO | WO 2008/025195 | * | 6/2008 | ............. A01G 25/06 |

*Primary Examiner* — Andrea Valenti

(57) ABSTRACT

An environment-friendly planting device with automatic percolation and irrigation of hermetic liquid includes a planting container and draining and irrigating pipes. An inner part of the planting container is orderly provided with a first layer having ceramic aggregates and sand, a second layer having medical stones, sand and perlites, and an organic substrate layer from bottom to top. The first layer and the second layer are for storing water. The first layer has a first draining and irrigating pipe having a U-shaped inner cavity. The second layer has a second draining and irrigating pipe having a U-shaped inner cavity as a snorkel. The first draining and irrigating pipe and the second draining and irrigating pipe respectively have a first end connected to a vertical water inlet pipe, and a second end sealed. A bottom of the water inlet pipe is sealed. The organic substrate layer is for cultivating plants therein.

14 Claims, 20 Drawing Sheets

(56) References Cited

U.S. PATENT DOCUMENTS

| | | | |
|---|---|---|---|
| 5,287,650 A * | 2/1994 | Moriguchi et al. | 47/59 R |
| 7,237,980 B2 * | 7/2007 | Fu | 405/36 |
| 8,632,273 B2 * | 1/2014 | Leung | 405/36 |
| 2002/0017055 A1 * | 2/2002 | Nalbandian et al. | 47/48.5 |
| 2002/0057945 A1 * | 5/2002 | Dahowski et al. | 405/118 |
| 2002/0088177 A1 * | 7/2002 | Gergek | 47/79 |
| 2007/0033871 A1 * | 2/2007 | Kelly et al. | 47/58.108 |
| 2008/0226393 A1 * | 9/2008 | Leun | 405/43 |
| 2009/0320367 A1 * | 12/2009 | Smith et al. | 47/66.7 |
| 2010/0139161 A1 * | 6/2010 | Porter | 47/66.7 |
| 2011/0174378 A1 * | 7/2011 | Leung | 137/1 |

* cited by examiner for planting vegetables
and greening regular irrigation and fertilization water outfall for full storage,
whose height can be adjusted inductor of full storage to
stop pumping outlet sluice 27a 27b (a) sketch view of a whole system (b) sectional view 28b of a planting slot 1-reflowing pips; 2-liquid storage pool; 3-pump; 4-planting slot; 5-main liquid supplying pipe; 6-liquid supplying pipe; 7-sprout; 8-draining and irrigating pipe; 9-wooden clamp; 10-polyethylene film end of a draining slot

ENVIRONMENT-FRIENDLY PLANTING DEVICE WITH AUTOMATIC PERCOLATION AND IRRIGATION OF HERMETIC LIQUID

BACKGROUND OF THE PRESENT INVENTION

1. Field of Invention

The present invention relates to an environment-friendly and hermetic planting device with automatic draining and irrigating having draining and irrigating pipes provided inside.

2. Description of Related Arts

Today, indoor greening mainly uses flowerpots which have soil inside. Trees and flowers are planted in the soil and watered irregularly, which leads to too much water or too little water. Thus the plants are always drowned or dried to death. Besides, soils and fertilizers are always washed out during watering to pollute the environment. Outdoor greening mainly depends on planting, which occupies large areas and wastes water.

At present there are still no ideal greening methods for the lobby, the square, the vertical walls, the roof and the desert. Published applications searched from the international application process are CN2194598Y, CN2478335Y, CN101113591A, CN2481136Y, CN2598331Y and CN2327176Y. All of them are not related with the present invention.

SUMMARY OF THE PRESENT INVENTION

An object of the present invention is to provide an environment-friendly and hermetic planting device with automatic draining and irrigating which has a first layer comprising ceramic aggregates and sand, a second layer comprising medical stones, sand and perlites, an organic substrate layer and draining and irrigating pipes. The device is applied as a single flowerpot, for a large-scale cultivation, or for a three-dimensional cultivation, as well as in all spaces such as indoor and outdoor walls, roofs, squares, playgrounds, hillsides, deserts, islands, warships, space stations and for purposes such as civil engineering, draining and irrigating and filtration.

The present invention adopts following technical solutions. The device comprises a planting container and draining and irrigating pipes, wherein the planting container is orderly provided with a first layer comprising ceramic aggregates and sand, a second layer comprising medical stones, sand and perlites and an organic substrate layer from bottom to top. The first layer and the second layer form a water storage layer, or the water storage layer is only made of organic substrates, wherein a first draining and irrigating pipe having a U-shaped inner cavity is provided in the first layer and first draining and irrigating holes thereof are for allowing water in and out; a second draining and irrigating pipe having a U-shaped inner cavity is provided in the second layer as a snorkel and second draining and irrigating holes thereof are for allowing water in and out. The first draining and irrigating pipe and the second draining and irrigating pipe respectively have a first end connected to a vertical water inlet and breathing pipe, and a second end sealed or connected to the vertical water inlet and breathing pipe. A bottom of the water inlet pipe is also sealed. The organic substrate layer is for planting trees and flowers.

The technical solutions further comprise the following.

The first end of the first draining and irrigating pipe in the planting container is connected to the vertical water inlet and breathing pipe. The second end of the first draining and irrigating pipe is sealed or connected to a water level indicator which has markings of a maximal water level and a minimal water level. The second draining and irrigating pipe has the first end connected to the vertical snorkel and the second end sealed or connected to the vertical water inlet and breathing pipe.

The draining and irrigating pipe comprises a pipe body and a U-shaped draining and irrigating pipe inserted in and connected to the pipe body. The pipe body is a round pipe having an end surface more than a semicircle and an open zone; convex bars are provided in an inner part of the pipe body along an axial direction; the draining and irrigating holes are arranged on two sides of the U-shaped draining and irrigating pipe and have filtrating screens covering thereon; the U-shaped draining and irrigating pipe is inserted and connected between the convex bars and the open zone.

The water inlet pipe has a marking of a maximal water level, or has a float indicating height of water level, wherein the maximal water level thereof is lower than a bottom of the second draining and irrigating pipe.

An overflow vent is provided at an end part of the first draining and irrigating pipe.

An anti-insect lid having holes for breathing is covering on a mouth of the snorkel of the second draining and irrigating pipe.

The flat arrangement comprises several planting containers in series connection. The first draining and irrigating pipes or the second draining and irrigating pipes in the connected planting containers are connected with each other into a series, wherein a first vertical water inlet and breathing pipe is provided in the first planting container and a water recycling box is provided in the last planting container. A pump is provided in the water recycling box and connected to the first vertical water inlet and breathing pipe of the first planting container through pipelines The three-dimensional arrangement comprises a three-dimensional tubular planting which comprises a three-dimensional shelf and tubular planting containers. The tubular planting containers are in series connection from top to bottom and fixed on the three-dimensional shelf. The first draining and irrigating pipes and the second draining and irrigating pipes in the connected tubular planting containers are connected with each other into a series, wherein a first vertical water inlet and breathing pipe is provided in the first tubular planting container, and a water recycling box is provided in the last tubular planting container. A pump is provided in the water recycling box and connected to the first vertical water inlet and breathing pipe of the first tubular planting container through pipelines. Planting holes or planting channels for planting trees and flowers are arranged on surfaces of the tubular planting containers.

The planting container comprises a plastic film cylinder or a plastic film slot, which is used on the desert or in the desert. The plastic film cylinder is filled with sand or other substrates and has a layer for storing water in a lower part thereof. The draining and irrigating pipes are provided in the sand. Ends of entrance and exit of the draining and irrigating pipe are higher than the layer for storing water in the plastic film cylinder. Planting holes or planting slots are provided on the plastic film for planting trees and flowers therein.

The device further comprises solar panels or wind generators, which are connected with storage batteries for supplying electricity to the pump.

The device further comprises a rainwater collecting and utilizing system which has the rainwater recycling box, the planting containers and a rain inductor. The rainwater recycling box and water outfalls of the planting containers are connected with each other. A float and a pump are provided in the rainwater recycling box, wherein the float controls water inlets of the planting containers. The rain inductor is connected to the water inlet pipes of the planting containers through a timer and the pump.

A capillary moisture insulating layer and a filtrating layer of pumices or active carbons are orderly provided from bottom to top above the organic substrate layer of the planting container, wherein the capillary moisture insulating layer comprises sand or orchid stones and a filtrating layer of pumices or active carbons. Or the water storage layer is only made of organic substrates.

The present invention has beneficial results comprising greening the environment, big areas for plants, no pollution, environment friendliness, saving water and fertilizers, no loss of fertilizers to avoid secondary pollution, purifying the air, producing anions, reducing carbon and increasing oxygen, planting food and herbs, wide application fields, a simple structure, low costs and so on.

Figure 1:
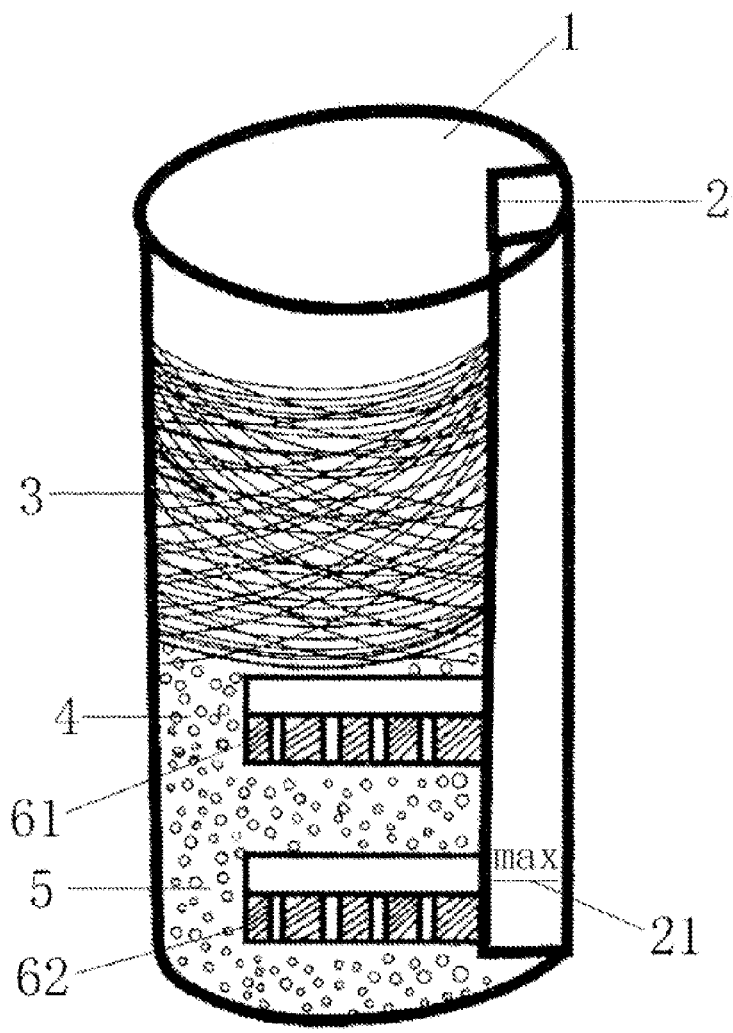
FIG. 1 is a sketch view of a basic structure of the present invention according to a first embodiment of the present invention.
Figure 2:
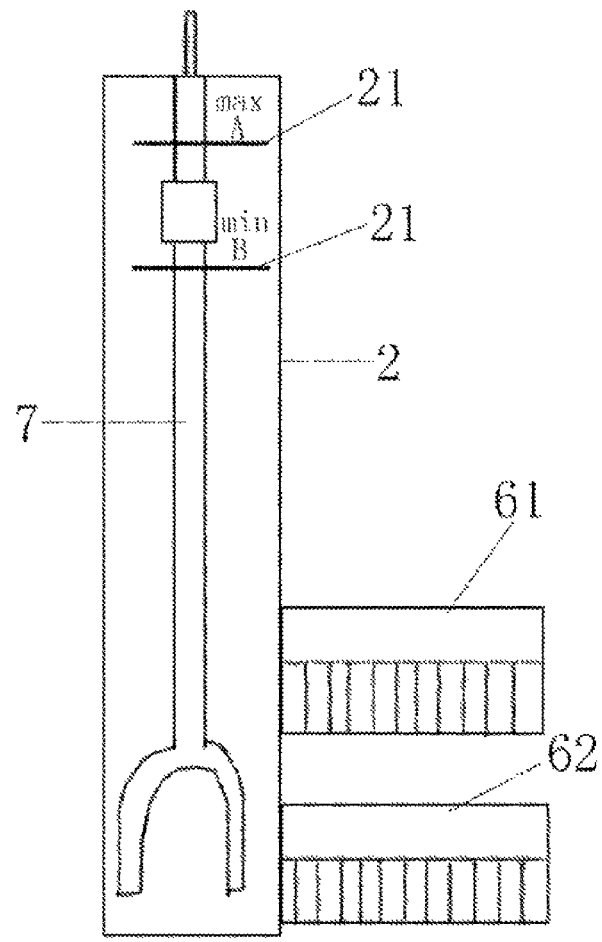
FIG. 2 is a sketch view of a component of draining and irrigating pipes in FIG. 1 according to the first embodiment of the present invention.
Figure 3:
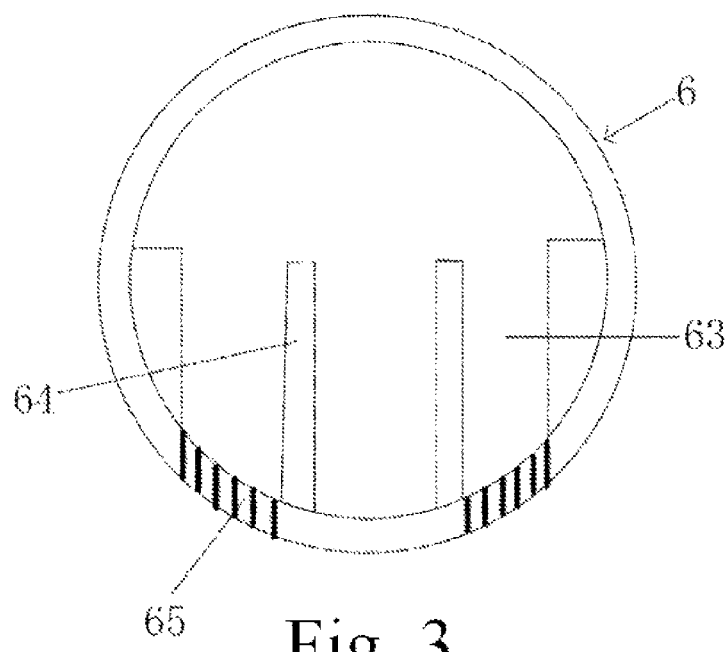
FIG. 3 is a sketch view of the draining and irrigating pipes in FIG. 1 according to the first embodiment of the present invention.

1—planting container; 2—vertical water inlet and breathing pipe; 21—water level marking; 22—pipe joint; 3—organic substrate layer; 4—second layer comprising medical stones, sand and perlites; 5—first layer comprising ceramic aggregates and sand; 6—draining and irrigating pipe; 61—second draining and irrigating pipe; 62—first draining and irrigating pipe; 621—overflow vent; 63—draining and irrigating hole; 64—U-shaped inner cavity; 65—filtrating screen; 7—float; 8—water recycling box; 81—pump; 9—snorkel; 10—plants; 11—three-dimensional shelf; 12—tubular planting container; 121—planting hole or planting slot; 122—anti-insect lid; 13—wall; 14—plastic film cylinder; 15—cover; 16—water storage tank; 17—water adjustment valve; 18—water supply pipe; 19—overflow pipe; 20—water level indicator; 21—water level; 22—pipe joint; 30—overflow vent; 31—draining pipe; 32—rain inductor; 33—timer; 34—external pump; 35—rainwater recycling or draining vent; 36—upward water supply pipe; 37—roof; 38—waterproof film; 39—roof outfall; 40—storage battery; 41—solar panel; 42—wind generator; 50—pipe body; 51—convex bar; 70—filtrating screen; 90—U-typed draining and irrigating pipe; 91—draining and irrigating hole; 92—draining and irrigating channel; 100—automatic draining and irrigating triangle slot; 101—PP (Polypropylen) transparent film.

DETAILED DESCRIPTION OF THE PREFERRED EMBODIMENT

Combined with the drawings, further illustration of the present invention is following.

A First Preferred Embodiment (A Basic Type)

FIGS. 1, 2, 3 and 19 show a flowerpot which is fit for tables and comprises a planting container 1 (made of cylindrical organic glass or other transparent materials) and draining and irrigating pipes 6. A first layer 5 comprising ceramic aggregates and sand, a second layer 4 comprising medical stones, sand and perlites, an organic substrate layer 3, a capillary moisture insulating layer and a filtrating layer of pumices or active carbons are orderly provided in the planting container 1 from bottom to top. The first layer 5 and the second layer 4 are for storing water. A first draining and irrigating pipe 62 having a U-typed inner cavity is provided in the first layer 5. A draining and irrigating hole 63 at a bottom of the first draining and irrigating pipe 62 has a filtrating screen or directly allows water in and out. An identical second draining and irrigating pipe 61 is provided in the second layer 4 as a snorkel. The first draining and irrigating pipe 62 and the second draining and irrigating pipe 61 respectively have a first end connected to a vertical water inlet and breathing pipe 2 and a second end sealed. A bottom of the vertical water inlet and breathing pipe 2 is sealed. The organic substrate layer 3 is for planting trees and flowers. The vertical water inlet and breathing pipe 2 has water level markings 21 which are below the second draining and irrigating pipe 61 to realize a function of the second draining and irrigating 61 as a snorkel. A float 7 in the vertical water inlet and breathing pipe 2 is also fit for indicating water levels. The draining and irrigating pipe 6 comprises a pipe body 50 and a U-typed draining and irrigating pipe 90 inserted in and connected to the pipe body 50. The pipe body 50 is a round pipe having an end surface more than a semicircle and an open zone (i.e., a pipe having a longitudinal open slot thereon), wherein convex bars 51 are provided in an inner part thereof along an axial direction. The draining and irrigating holes 91 are arranged on two sides of the U-typed draining and irrigating pipe 90 and have filtrating screens 70 thereon. The U-typed draining and irrigating pipe 90 is inserted and connected between the convex bars 51 and the open zone.

A Second Preferred Embodiment

Figure 4:
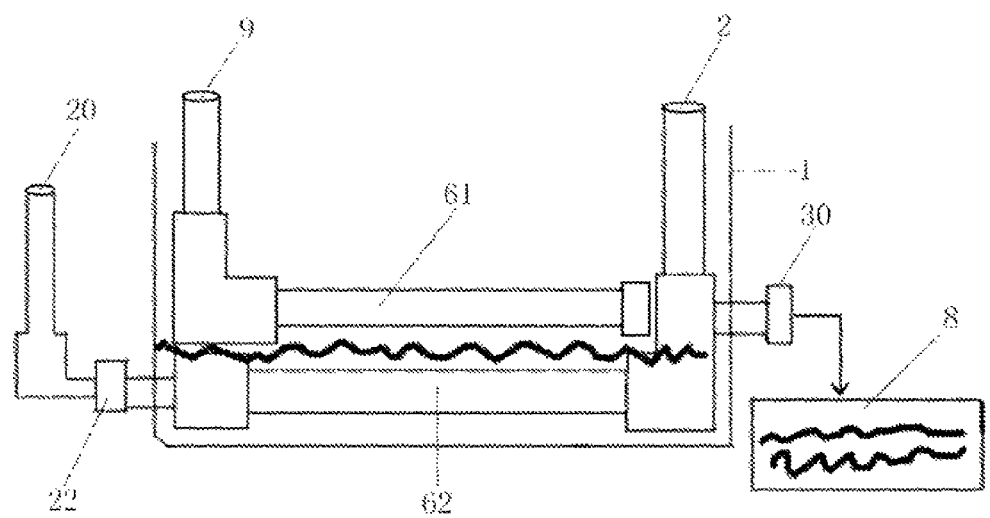
FIG. 4 is s sketch view of a box-typed planting container according to a second embodiment of the present invention.
Figure 5:
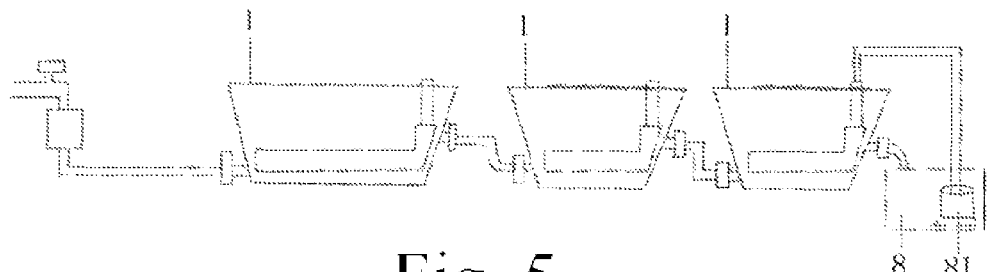
FIG. 5 is a sketch view of a large-scale series connection of the present invention according to the second and a third embodiment of the present invention.
Figure 15:
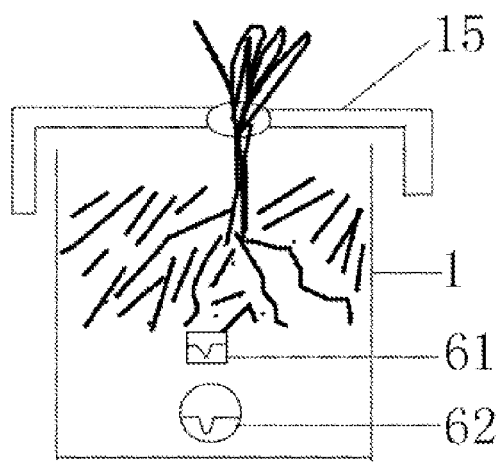
FIG. 15 is a sketch view of the planting container having the cover according to the second embodiment of the present invention.

As shown in FIG. 4 and FIG. 5, the second preferred embodiment is an improvement based on the first preferred embodiment, wherein several devices are in series connection for a large-scale application, such as on a roof. The series connection is realized through connecting each second draining and irrigating pipe 61 of each planting container 1 together in series. The planting container 1 is box-typed and has an identical first layer 5, an identical second layer 4 and an identical organic substrate layer 3. The difference is that a first draining and irrigating pipe 62 has a first end connected to a vertical water inlet and breathing pipe 2 and a second end sealed or connected to a water level indicator 20 having markings of a maximal water level, max, and a minimal water level, min. An overflow vent 30 is provided at a bottom of the vertical water inlet and breathing pipe 2. When the water level in the box is higher than the second draining and irrigating pipe 61, by opening a rubber plug, surplus water is driven into a water recycling box 8. The second draining and irrigating pipe 61 has a first end connected to a vertical snorkel 9 and a second end sealed. An anti-insect lid 122 (in FIG. 8) having breathing holes is provided on the snorkel 9 to protect the snorkel 9 from unwelcome objects such as insects. A cover 15 (in FIG. 15) is covering on the planting container 1. A planting hole or a planting slot 121 having plants growing thereon is provided in the cover 15. The cover 15 (in FIG. 15) is dissembled into two identical parts from a central line to easily open the cover 15.

A Third Preferred Embodiment

FIG. 5 shows a series connection of the present invention, which is applied in a large-scale cultivation, such as on a roof or on a square.

A Fourth Preferred Embodiment

Figure 6:
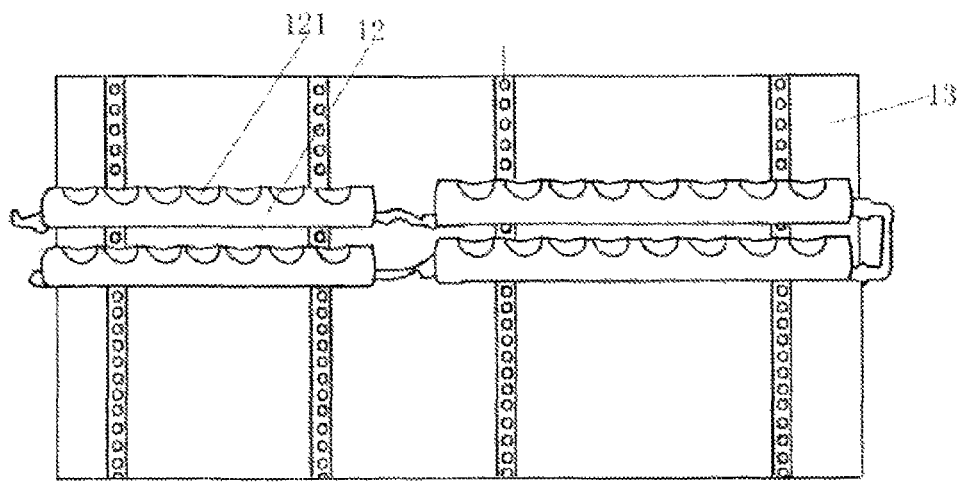
FIG. 6 is a sketch view of a three-dimensional arrangement of the present invention according to a fourth embodiment of the present invention.
Figure 7:
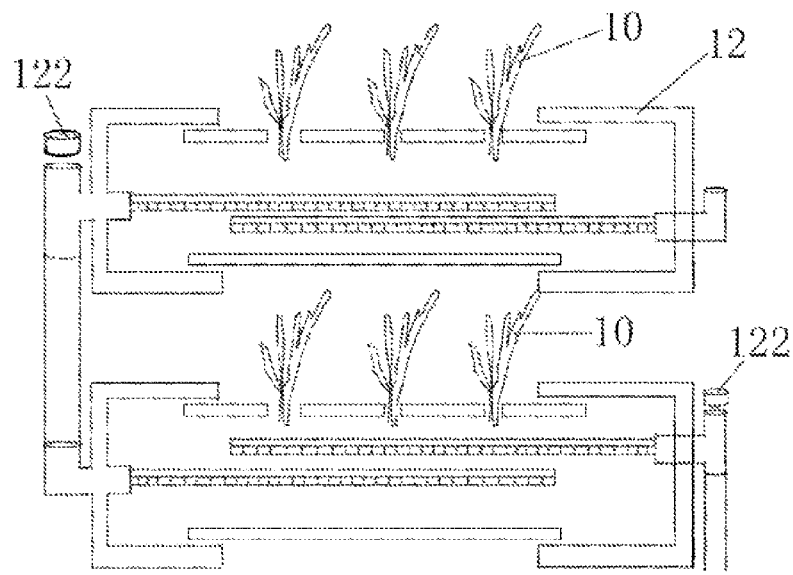
FIG. 7 is a sketch view of the three-dimensional arrangement of the present invention according to the fourth embodiment of the present invention.
Figure 8:
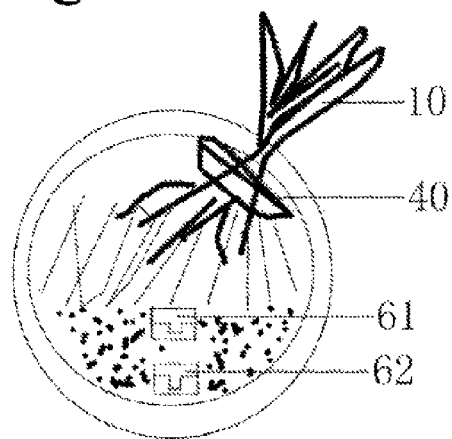
FIG. 8 is a sketch view of the three-dimensional arrangement of the present invention according to the fourth embodiment of the present invention.

FIGS. 6, 7 and 8 show a three-dimensional arrangement of the present invention. A three-dimensional shelf 11 is fixed on a wall 13. Planting containers 1 are arranged on the three-dimensional shelf 11. The planting container 1 is a planting channel having planting pits arranged thereon, or a tubular planting container 12 having planting holes or planting slots 121 arranged thereon and also having an identical first layer 5, an identical second layer 4, an identical organic substrate layer 3 and draining and irrigating pipes 6. First draining and irrigating pipes or second draining and irrigating pipes 61 of the tubular planting containers 12 are connected into a series. The planting holes or the planting slots 121 are inclined to prevent stuff therein from falling out. A sealing cloth 40 is provided in the planting hole or the planting slot 121. The three-dimensional arrangement is applied in lobbies, hotels, restaurants, schools, airports, bus stations and so on to beautify environments without occupying too much space.

Figure 9:
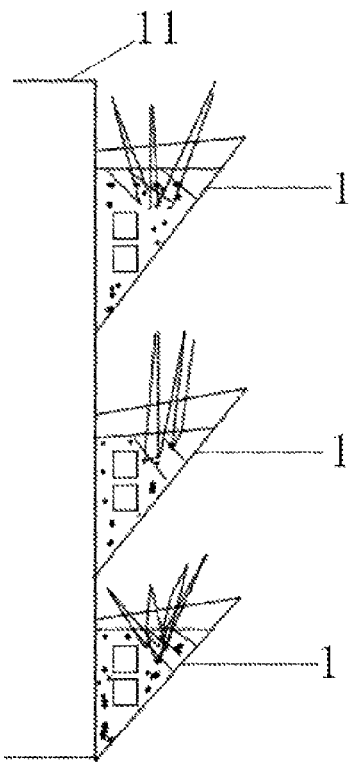
FIG. 9 is a sketch view of the three-dimensional arrangement of the present invention according to the fourth embodiment of the present invention.
Figure 10:
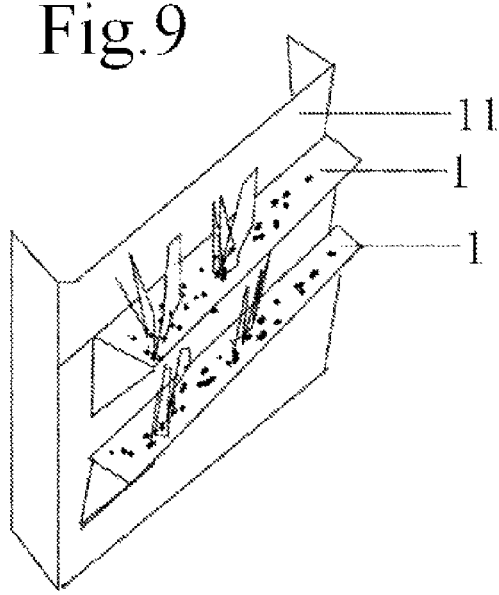
FIG. 10 is a sketch view of the three-dimensional arrangement of the present invention according to the fourth embodiment of the present invention.
Figure 11:
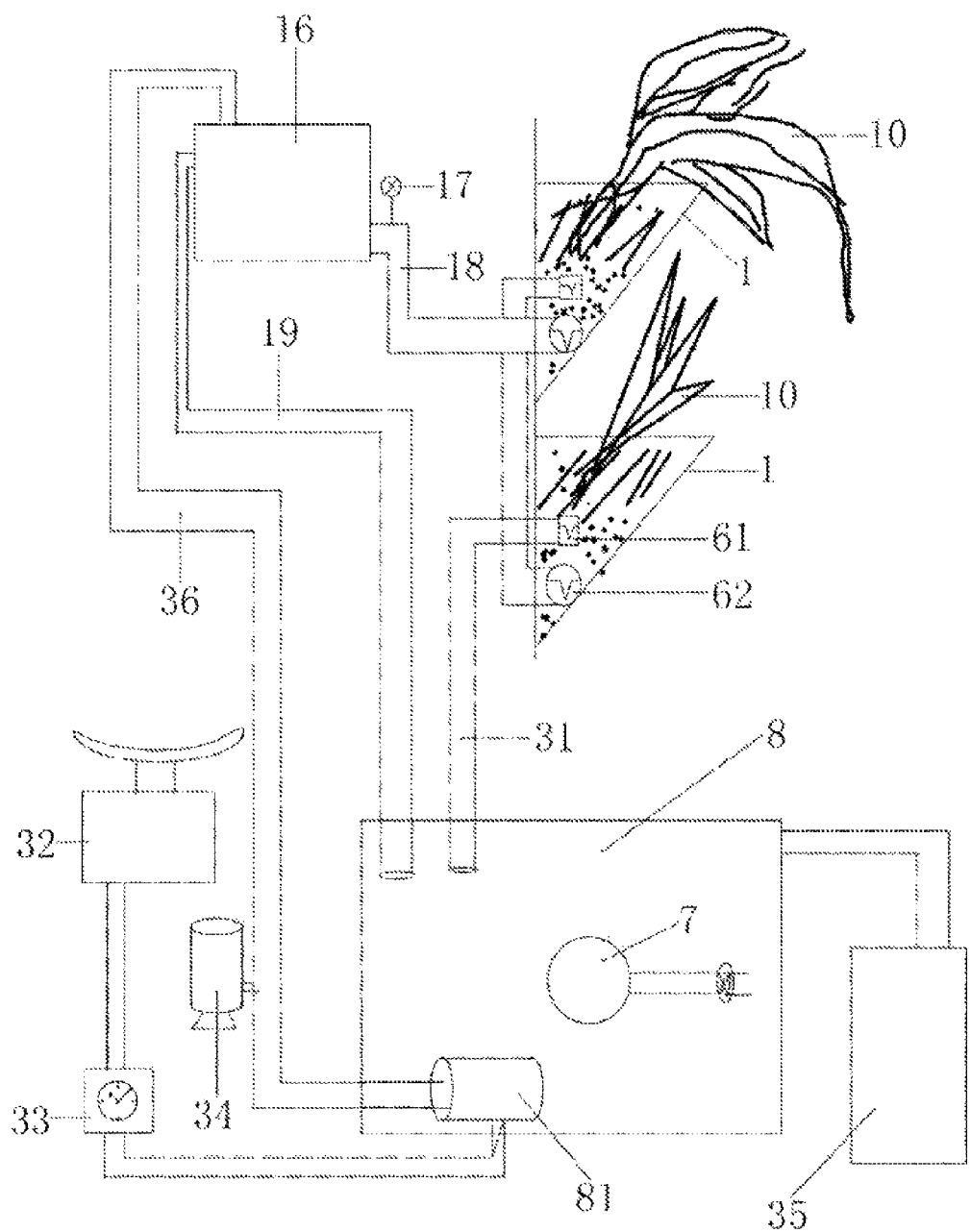
FIG. 11 is a sketch view of the three-dimensional arrangement of the present invention according to the fourth embodiment of the present invention.

FIGS. 9, 10 and 11 show an additional three-dimensional arrangement which has a triangular planting container 1 and a system for automatically recycling rainwater. The system comprises a water recycling box 8, a water storage tank 16, rainwater recycling or draining vent 35, a rain inductor 32, a timer 33 and an external pump 34. A first draining and irrigating pipe or a second draining and irrigating pipe 61 in a series connection is connected to the water recycling box 8 through a draining pipe 31. A float 7 and a pump 81 are provided in the water recycling box 8. The water storage tank 16 is respectively connected to a first draining and irrigating pipe 62 through a water supply pipe 18, connected to the water recycling box 8 through an overflow pipe 19 and connected to the pump 81 through an upward water supply pipe 36. The rain inductor 32 is connected to the pump 81 through the timer 33. The external pump 34 is provided externally on the upward water supply pipe 36. A water adjustment valve 17 is provided on the water supply pipe 18. When the rainwater level is higher than the first draining and irrigating pipe or the second draining and irrigating pipe 61, the rainwater is driven by the first draining and irrigating pipe or the second draining and irrigating pipe 61 into the water recycling box 8 under siphonage principle. The rain inductor 32 controls the pump 81 to supply water into the water storage tank 16 through the timer 33, so as to further supply water to the planting container 1. When the water storage tank 16 is full, water therein flows back into the water recycling box 8. When the water recycling box 8 is full, water therein enters the rainwater recycling or draining vent 35 for storage or drainage.

A Fifth Preferred Embodiment

Figure 12:
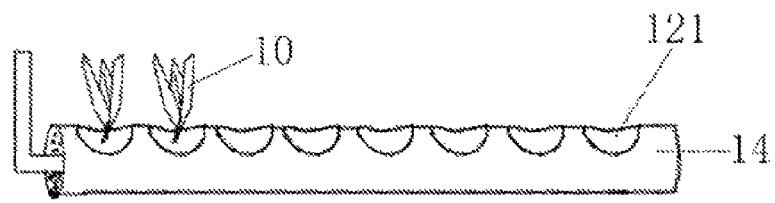
FIG. 12 is a sketch view of an application in a desert of the present invention according to a fifth embodiment of the present invention.
Figure 13:
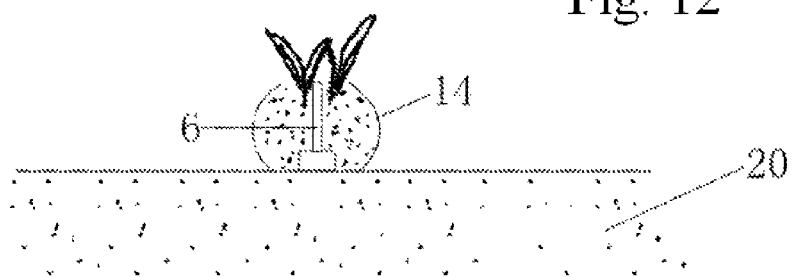
FIG. 13 is a sketch view of the application in a desert of the present invention according to the fifth embodiment of the present invention.
Figure 14:
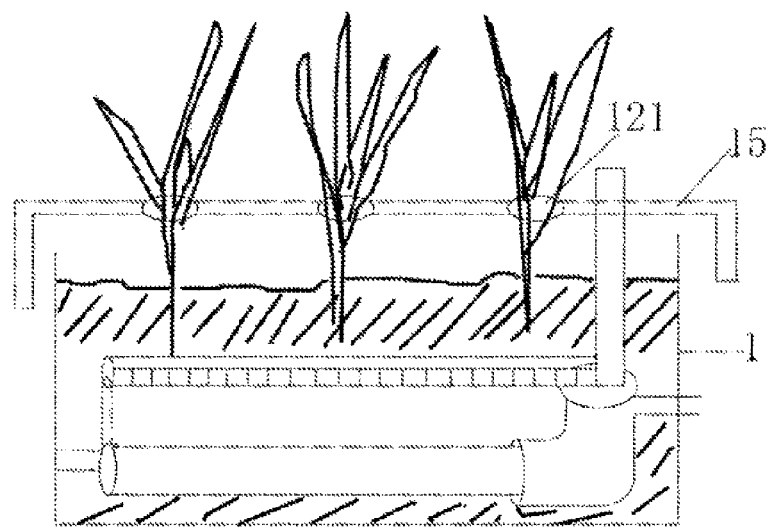
FIG. 14 is a sketch view of a planting container having a cover according to the second embodiment of the present invention.

FIGS. 12 and 13 show an application in a desert of the present invention. A plastic film cylinder 14 is made by spreading a plastic film on the desert, filling with sand upon the plastic film, providing draining and irrigating pipes 6 at a bottom of the sand and then rolling the plastic film into a cylinder which has planting holes or planting slots 121 for planting trees and flowers therein. According to the fifth preferred embodiment, the present invention is able to effectively cure and green deserts and prevent desertification.

A Sixth Preferred Embodiment

Figure 16:
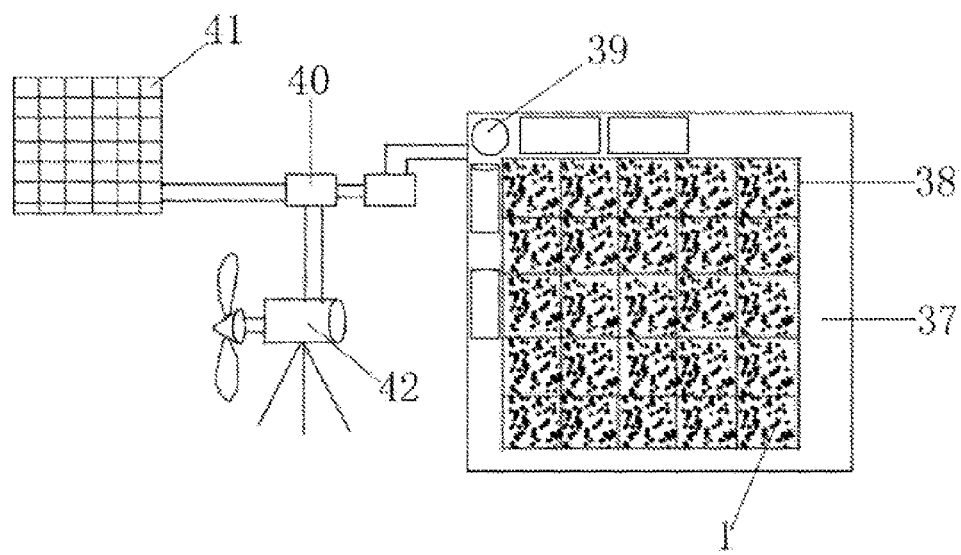
FIG. 16 is a sketch view of an application on a roof of the present invention according to a sixth embodiment of the present invention.
Figure 17:
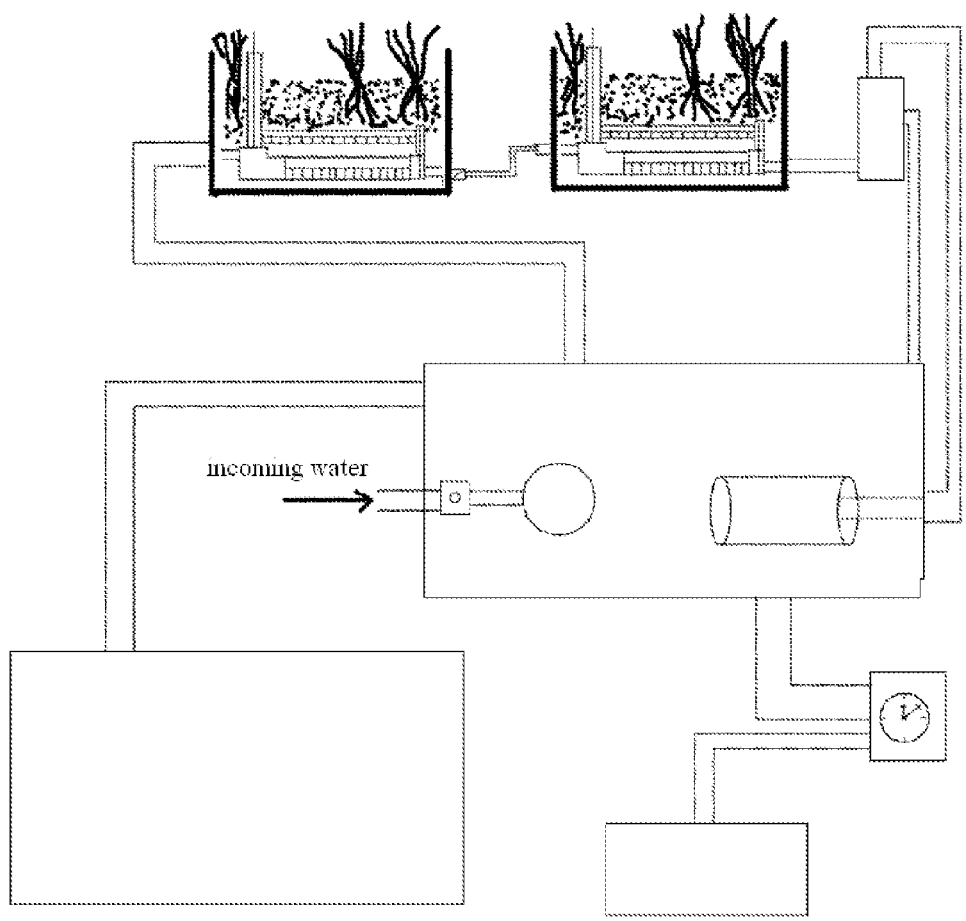
FIG. 17 is a sketch view of the application on a roof of the present invention according to the sixth embodiment of the present invention.

In FIG. 16 and FIG. 17, a waterproof film 38 is spread over a roof 37 and planting containers 1 are arranged in a large scale on the waterproof film 38, wherein an automatic water supply system is for recycling and utilizing rainwater to make full use of spaces on the roof for greening, in such a manner that results of lowering temperature and environment friendliness are accomplished.

A Seventh Preferred Embodiment

Figure 18:
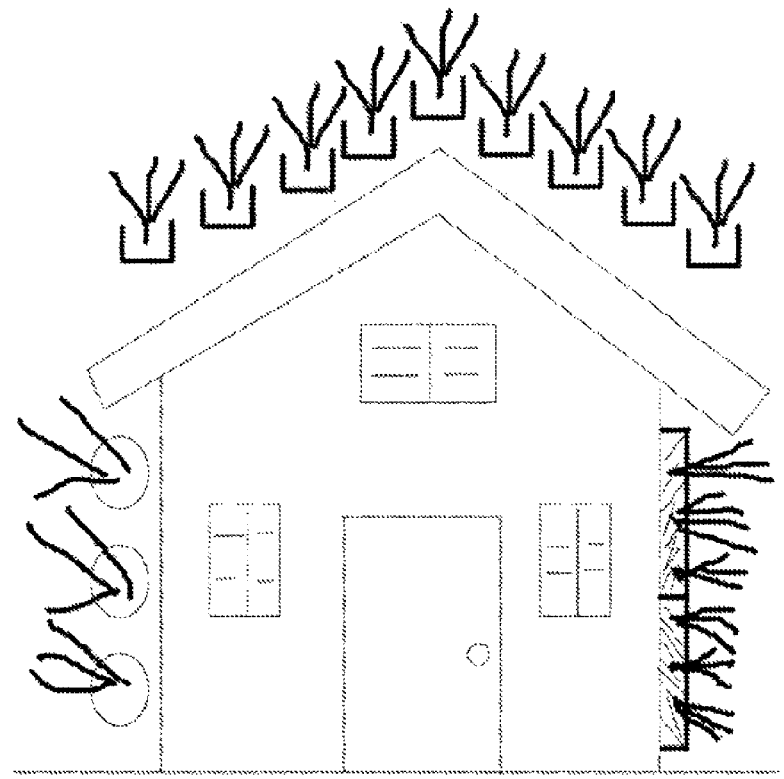
FIG. 18 is a sketch view of an application in a whole building of the present invention according to a seventh embodiment of the present invention.
Figure 19:
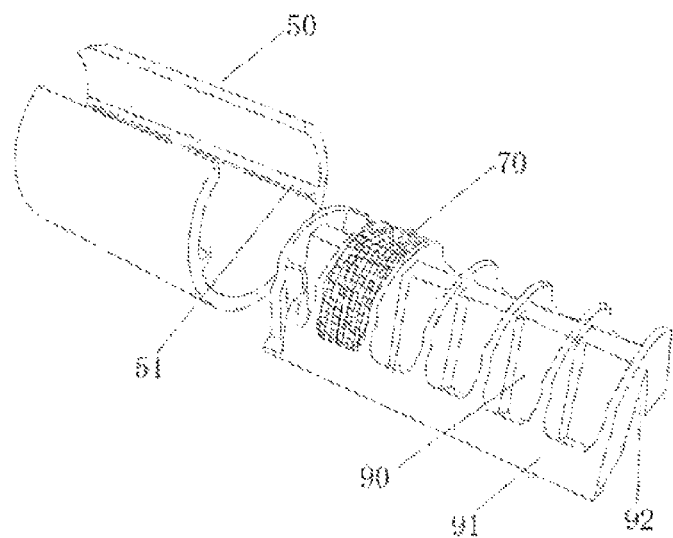
FIG. 19 is sketch views of the component of draining and irrigating pipes in FIG. 1 according to the first embodiment of the present invention.

As FIG. 18 shows, the present invention is applied on a roof or on an external wall of a house.

Description

Plants Back to the Nature

The draining and irrigating pipes are for imitating an underground watering. A nature-like environment is produced through functions of water as capillary tubes, siphonage principle and transpiration of the plants for the plants to breathe and absorb water freely.

Easy Plantation Without Trouble and Mosquitoes

Conventional planting pots produce many problems which always prevent many people interested in planting from trying. For example, too much water under the flowerpot and moist surfaces of the soils may lead to too many mosquitoes; there is too much or too little water; too little space among the soil disables the plants to breathe normally; improper fertilization kills plants' roots. However, the planting pot helps planters to know clearly about plants and to fertilize and water plants properly. Nutrition in the soil is also kept instead of being flushed away by water in a conventional planting method, in such a manner that water and fertilizers are saved.

Application Fields

Planting Organic Fruits and Vegetables

Agricultural chemicals, fertilizers and pollution force citizens to buy organic fruits and vegetables. Some citizens even want to plant by themselves but are troubled by having no rooftops, gardens or balconies. The planting pot allows planters to easily cultivate organic vegetables indoors and changed even a small windowsill into a small homemade farm field.

Greening Homes and Offices

As is known to all, by photosynthesis, plants absorb carbon dioxide to produce nutrition therefore and oxygen. However, at a background of global warming, greening becomes a key tone and the planting pot is a good partner in greening indoor environments because of simple operation and effective results.

Purifying Air Indoors

Most people spend 90% of time in indoor activities, while the indoor air is ten times dirtier than the outdoor air. Photocopiers, printers and computer screens in offices, as well as curtains, upholstery and ceramic tiles at home, release toxic chemicals. From a 25-years research made by NASA (National Aeronautics and Space Administration), it is proved that plants are able to remove the toxic chemicals in the air. Thus, a design of Duckswork Farm Pot contributes to the air circulation therein to greatly speed up removing chemicals. Pumices or other filtrating materials further provided in a Duckswork Farm Pot bring better results.

Providing Oxygen and Reducing Carbon for Bedrooms

In order to prevent losing moisture caused by open stomas, CAM (Crassulacean acid metabolism) plants absorb carbon dioxide at nights, which suits being put in the bedrooms. It is easier and simpler to use Duckswork Farm Pot for CAM plants, such as a sansevieria zeylanica willd and a Zygocactus truncatus (Haw.) K. Schum., which also solves the problem of mosquitoes in bedrooms and houses caused by planting.

Plantpot automatic draining and irrigating combination for purifying air functions through photosynthesis and roots' respiration to drive granules in the air to pass through pumices or active carbons provided on a substrate at the plants roots, in such a manner that the polluted air are purified through filtrating the granules in the air. Thus the combination is also a system for purifying and filtrating air indoors which is environment friendly and functions without any electricity.

No. 1—a filtrating layer of pumices or active carbons, which is for constantly filtrating polluted air near surfaces of roots.

No. 2—a capillary moisture insulating layer, which is for protecting pumices and active carbons from being moistened by humidity, wherein the humidity is driven by evaporations of capillaries and roots, so as to maintain a function of filtrating the air.

No. 3—a substrate layer, which comprises very loose substrate soils provide natural environments for roots to easily breathe the air and absorb the water and fertilizers through capillarity.

No. 4—Draining and irrigating pipes, which expose more air to roots and drive away surplus water and also the water for cleaning substrates.

No. 5—a layer for filtrating and storing water, which prevents jams in irrigation and venting excess water and fertilizers. Grains of sand are good media for sending out water and air. Or the layer for storing water is made of only organic substrates.

Working principles are following. Plants are for purifying volatile organic chemicals in the polluted air. Therefore, NASA takes advantage of indoor plants for purifying the air indoors, absorbing carbon dioxide and discharge oxygen to remove the polluted air in the hermetic cabins and rooms. And draining and irrigating pipes can be utilized for irrigating the roots and cleaning dejections of the substrate soil at the roots to slowly release out the water stored at a bottom of the combination without entering water for several days and irrigation on the substrate. As a result, the plants absorb the underground water in a natural environment and provide fresh air for respiration of roots in transpiration. And further, by providing filtrating pumices or active carbons on the substrate at the roots of the plants, the transpiration in the respiration of the roots drives the air to pass through the pumices and active carbons to filtrate the air. Green parts of the plants absorb carbons to produce oxygen and purify the air, while the transpiration in the respiration of the roots also produces a green combination for air purification and filtration to filtrate the polluted air.

Figure 20:
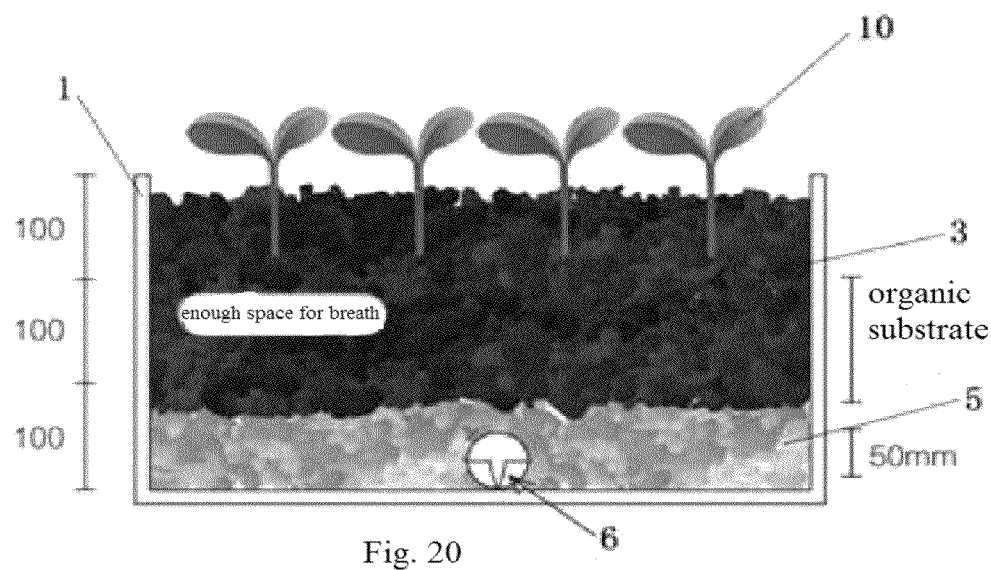
FIG. 20 is a sketch view of the application of the present invention according to the seventh preferred embodiment of the present invention.
Figure 21:
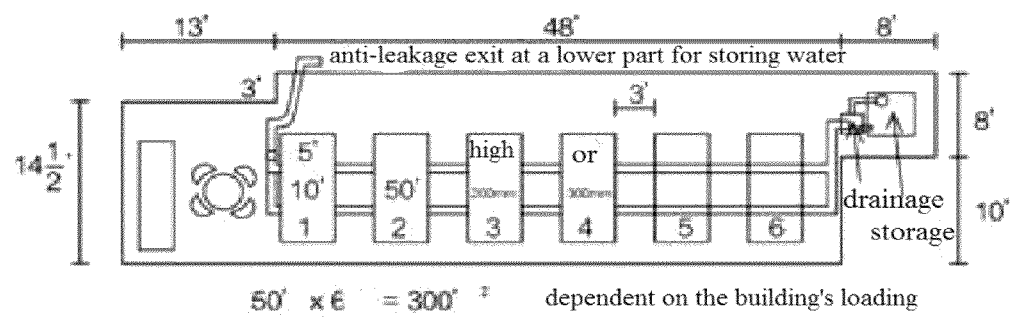
FIG. 21 is a sketch view of the application of the present invention according to the seventh preferred embodiment of the present invention.

FIG. 20 and FIG. 21 show a movable hermetic planting box with automatic percolation and irrigation and a rainwater recycle.

Figure 22:
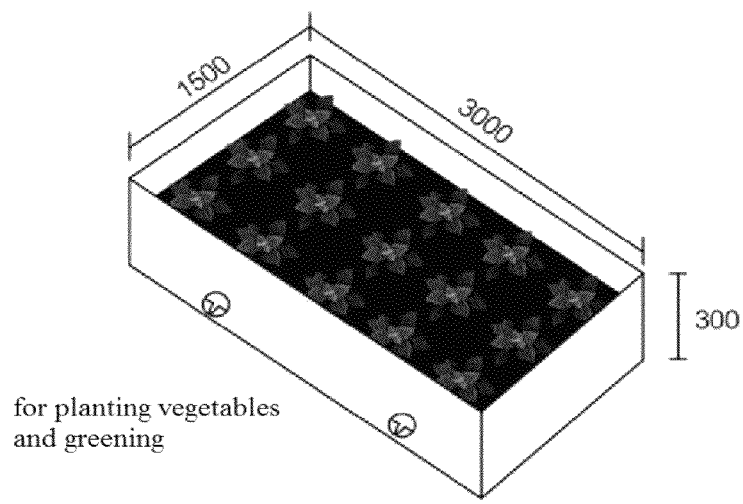
FIG. 22 is a sketch view of the application of the present invention according to the seventh preferred embodiment of the present invention.
Figure 23:
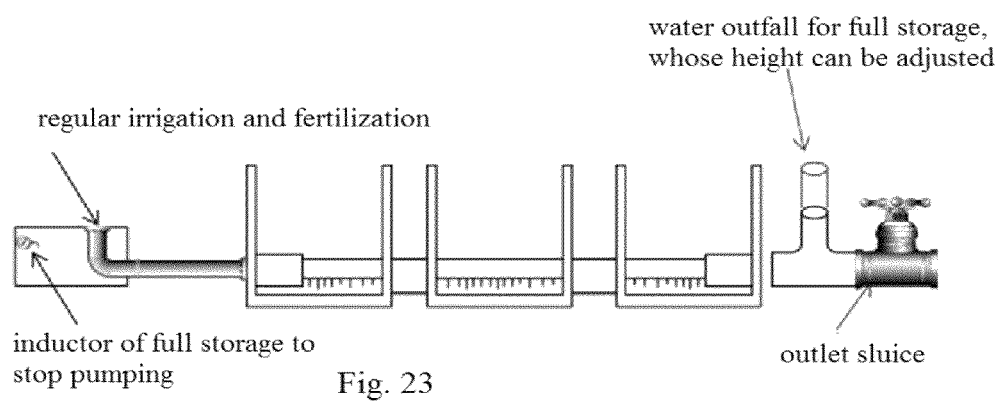
FIG. 23 is a sketch view of the application of the present invention according to the seventh preferred embodiment of the present invention.
Figure 24:
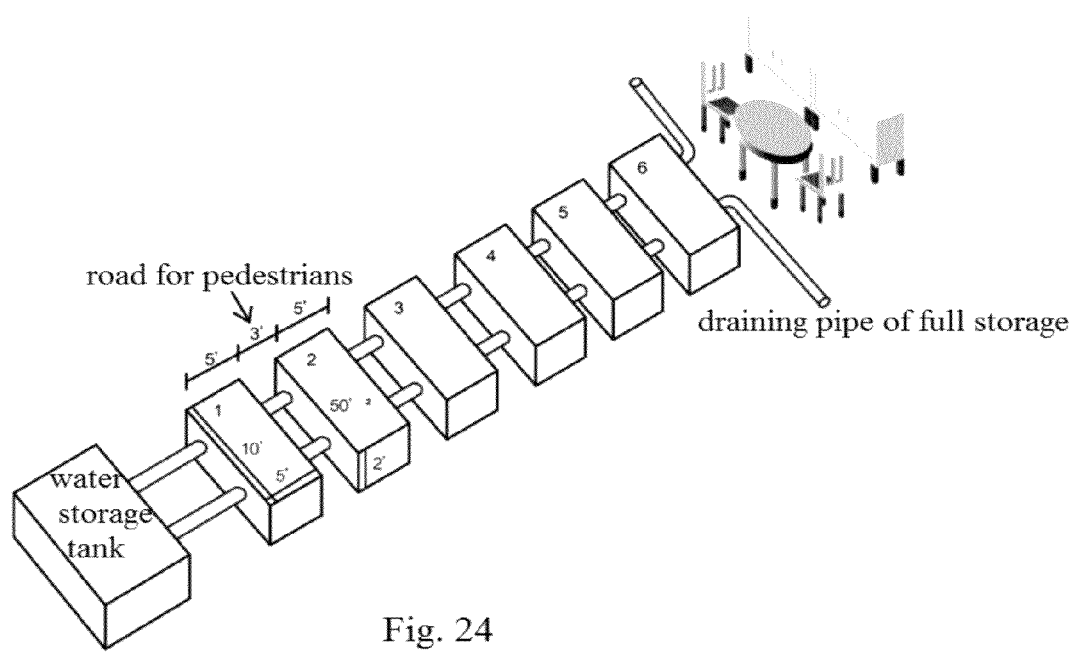
FIG. 24 is a sketch view of the application of the present invention according to the seventh preferred embodiment of the present invention.

As shown in the drawings from FIG. 22 to FIG. 24, by adding other lings, a general greening project is illustrated.

Figure 25:
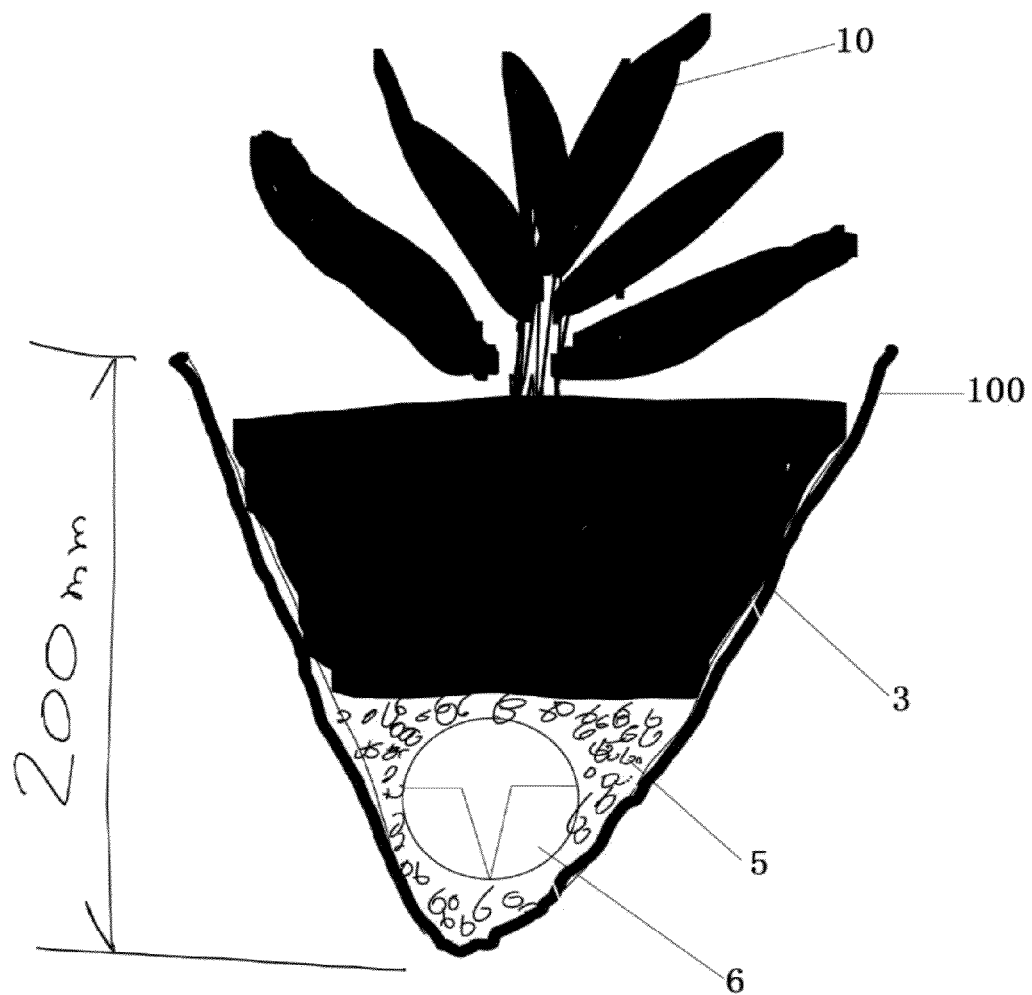
FIG. 25 is a sketch view of the application of the present invention according to the seventh preferred embodiment of the present invention.

FIG. 25 shows an automatic draining and irrigating triangular slot.

Figure 26:
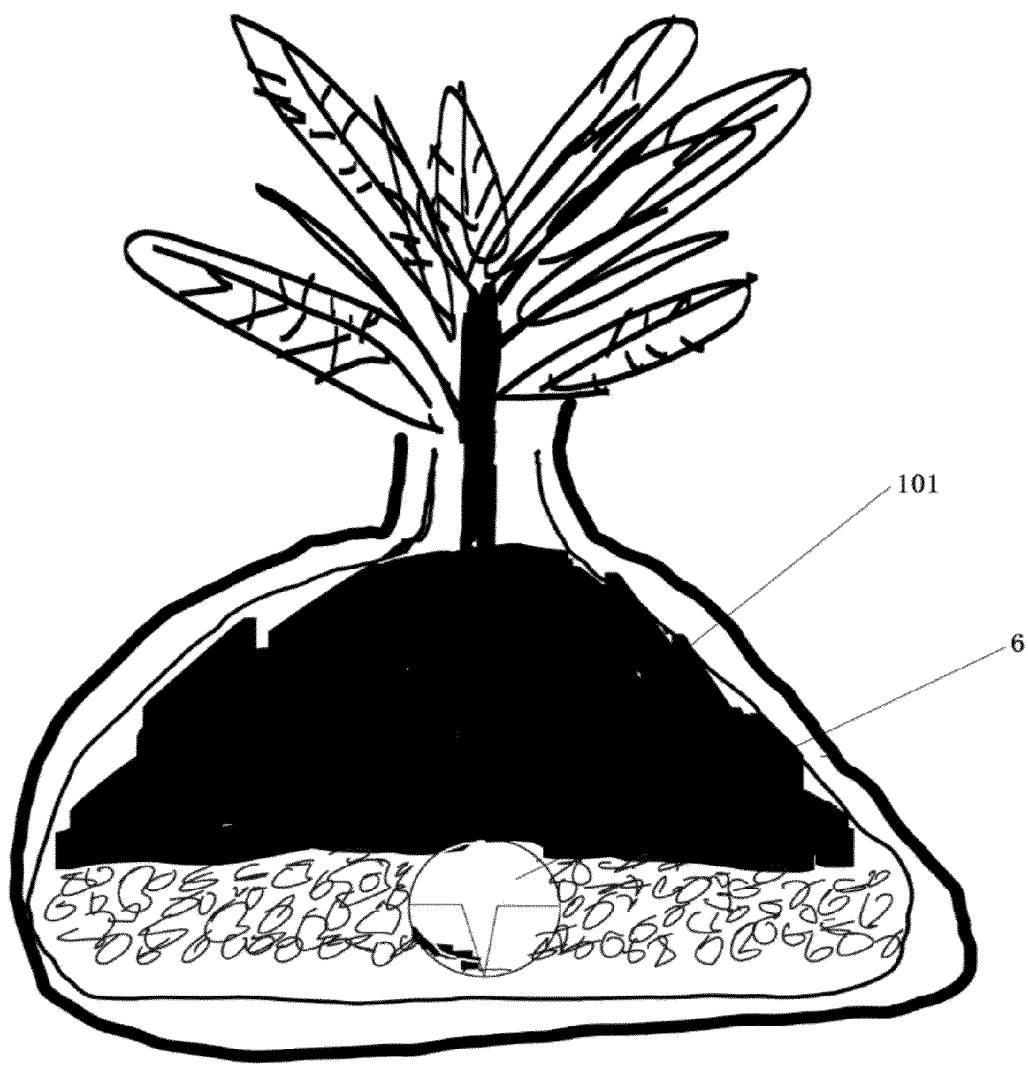
FIG. 26 is a sketch view of the application of the present invention according to the seventh preferred embodiment of the present invention.

FIG. 26 shows a plastic film planting slot.

Figure 27:
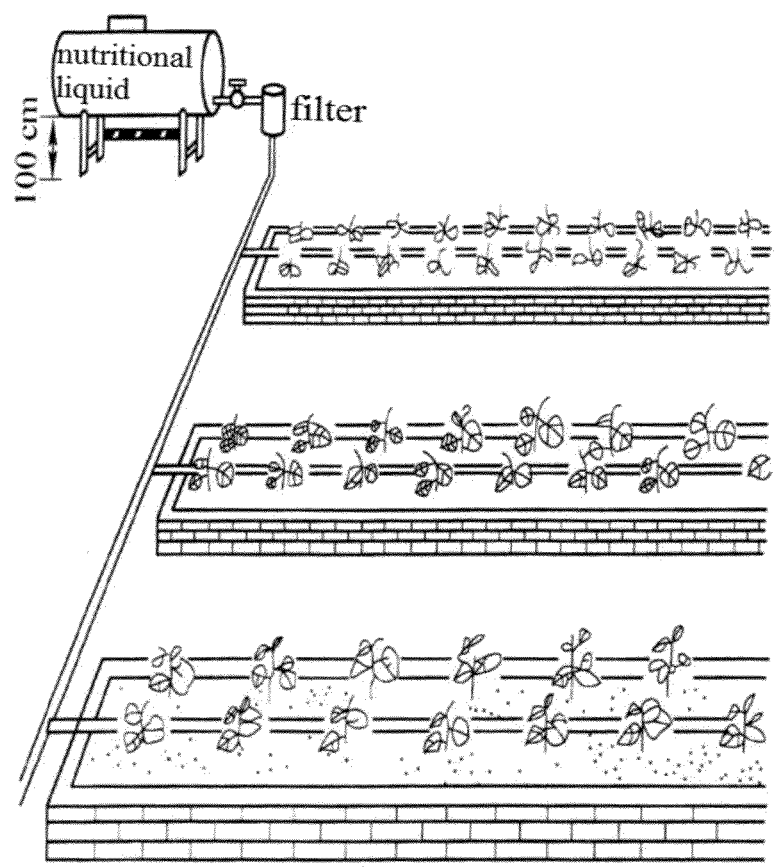
FIG. 27 is a sketch view of the application of the present invention according to the seventh preferred embodiment of the present invention.
Figure 27:
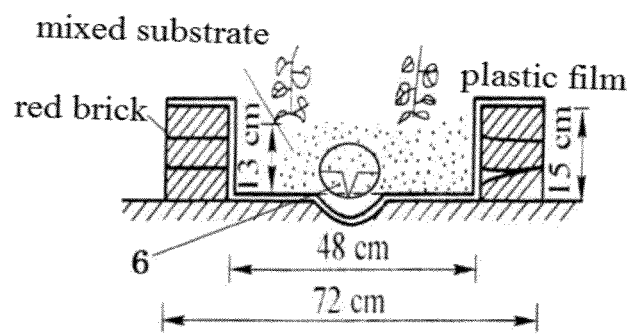

FIG. 27 shows a slot-typed planting combination.

Figure 28:
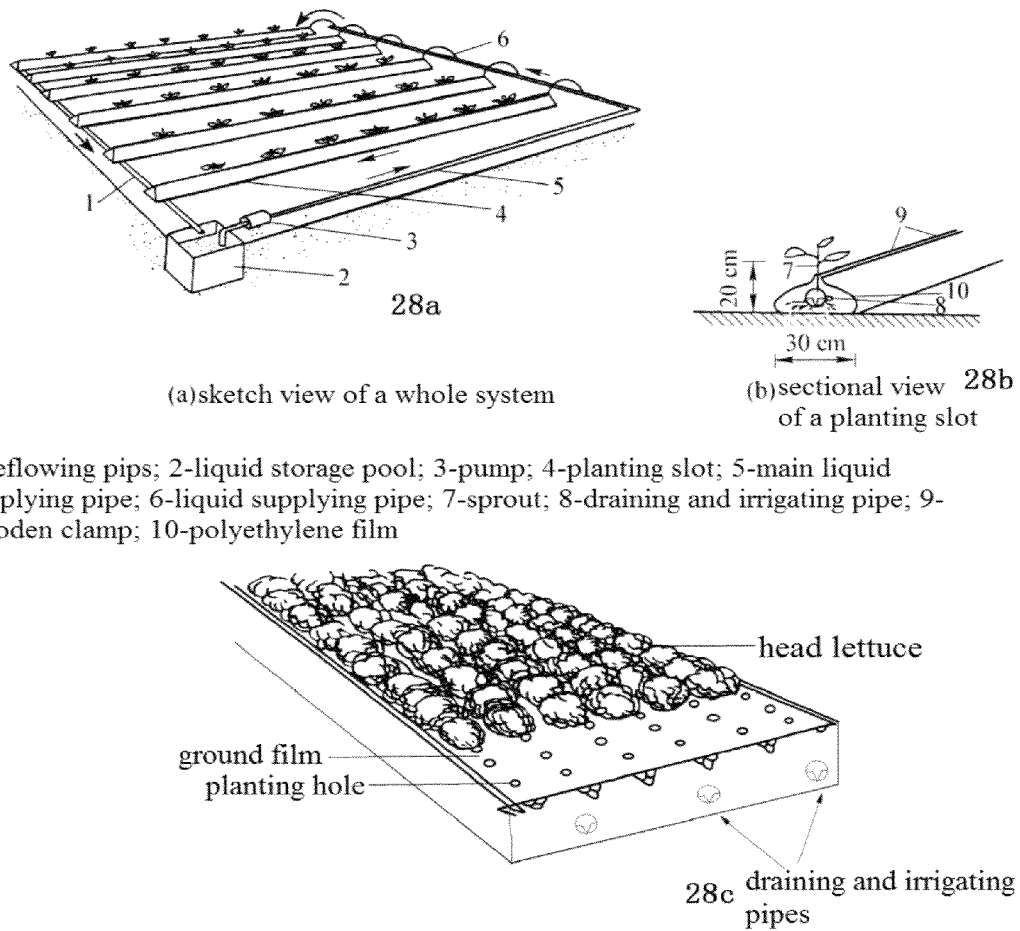
FIG. 28 is a sketch view of the application of the present invention according to the seventh preferred embodiment of the present invention.

FIG. 28 shows a soilless substrate nutritional film technology.

The soilless substrate nutritional film technology comprises a soilless substrate nutritional cultivation method having plants cultivated in a shallow flowing nutritional liquid. The planting slot is made of a light plastic film and has a simple structure and lost costs. The planting slot has a depth from 5 mm to 20 mm. A part of roots is immersed in the shallow soilless substrate nutritional liquid to absorb nutrition, and another part of roots is exposed in the soilless substrate filled with the air in the planting slot, which well satisfies the roots' need of oxygen for breathing. By using substrates in planting, the environment around the roots is highly stable, the requirements of technical ability of management staff and performance of devices are relatively low, and it is not easy for disease to be spread and infected over the whole system, in such a manner that a simple management is required. The soilless substrate nutritional film technology is widely applied in most gardening plant production and medical plant production.

The soilless substrate nutritional film technology mainly comprises planting slots, liquid storage pool, nutritional liquid recycling and flowing device and some auxiliary equipment (in FIG. 28a and FIG. 28b).

(1) The planting slots are divided into two categories based on different plant species. The first category is fit for big crop such as fruit vegetables, and the second category is fit for small crop such as leaf vegetables. The first planting slot for big crop (in FIG. 28a and FIG. 28b) is a triangle film slot circled by a polyethylene film having a thickness between 0.1 mm and 0.2 mm and a white surface and a black lining. The first slot has a length between 10 m and 25 m and a height of 20 cm, and a bottom thereof has a width between 25 cm and 30 cm, wherein a layer or two layers of draining and irrigating pipes are provided at the bottom of the first slot for improving water absorption and breathing of crops; the second slot (in FIG. 28c) is a close planting slot in several collateral lines, whose bottom is provided with corrugated tiles made of fiber-reinforced plastic or cement, wherein the corrugated tile has a wave trough between 2.5 cm and 5.0 cm, a crest distance between 13 cm and 18 cm, a width between 100 cm and 120 cm for 6 to 8 lines, a slot length around 20 m and a gradient between 1:70 and 1:100. The second planting slot made of corrugated tiles is usually put on a wood shelf or a metal shelf.

(2) The liquid storage pool is provided underground and covered by a covering board to prevent evaporation, whose volume should be able to supply enough water for the whole planting area to recycle.

(3) The nutritional liquid recycling and flowing system comprises a pump, pipes and water adjustment valve. The pump is a self-priming pump or a submerged pump which is strictly chosen and corrosion-resisting. A power of the pump matches with a recycling volume of the nutritional liquid of the whole planting area. In order to avoid corrosion, pipes are made of plastic, strictly sealed when being installed and at best connected through interlocking.

(4) The other auxiliary equipment mainly comprises an intermittent liquid supply timer, an electricity conductivity (EC) auto-control device, a PH value auto-control device, a device for heating and cooling nutritional liquid and a safety alarming device to prevent the recycling and supplying from being affected by a power cut or a malfunction in the pump, so as to reduce a labor intensity and improve an adjustment level of the nutritional liquid.

FIG. 27 shows an environment-friendly and hermetic slot-typed substrate cultivating device.

In a method that solid substrates for cultivation are put into the planting slots having a certain volume to cultivate crop (in FIG. 27), the organic substrate cultivation and heavy substrates having a relatively big unit weight (such as gravel and sand) are usually fit for the slot-typed substrate cultivation. The environment-friendly and hermetic slot-typed substrate cultivating device comprises a cultivating slots (beds), a liquid storage pool, liquid supplying pipes, a pump and a time controller. In order to prevent a corrosion of slightly acid nutritional liquid, a cement slot which is made of bricks or cement boards and has an inert coating covered on an inner side thereof, or has a polyethylene film or other insulating materials spread therein, is usually adopted, or the slot made of wood boards and coated with other insulating materials is adopted.

FIG. 29

Figure 29:
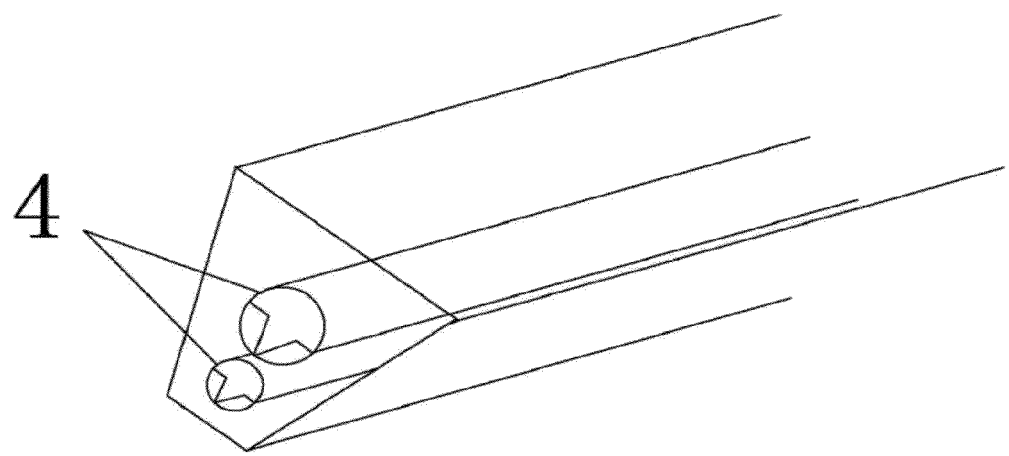
FIG. 29 is a sketch view of the application of the present invention according to the seventh preferred embodiment of the present invention.

As is shown in FIG. 29, a system of an environment-friendly hermetic slot-typed substrate cultivating device is an innovative soilless cultivating system, wherein a cultivating slot is filled with substrates 10 cm thick, and crop is irrigated by recycling water and nutritional liquid. The cultivating device comprises cultivating slots, a liquid storage pool, a supplying and draining pipe system, a time controller of liquid supplying and a pump. The cultivating slot comprises a first type made of stone and a second type made of cement in a shaped of an inverted U or a triangle without limitation in a length of the slot, wherein a polyethylene film or other insulating material is spread on an inner part of the slot, a cushion slot is provided in a middle part of the slot to have breakage-proof materials spread thereon as a cushion, a substrate is filled above the cushion slot to provide a space below the substrate for roots to grow and for the nutritional liquid to flow, and the liquid supplying pipes and the liquid draining pipes are provided at two ends of the slot (in FIG. 29a). The cultivating slot supplies water and nutritional liquid at regular time every day. The liquid storage pool is built by laying bricks or cement of high strength, wherein every cube is responsible for a cultivating area between 80 square meters and 100 square meters. The substrate of the environment-friendly and hermetic slot-typed substrate cultivating device fixes roots, works as a buffer and cultivates crop well. Therefore, the device is fit for all plants on the earth, different from the water cultivation method which is only fit for limited species.

Figure 29A:
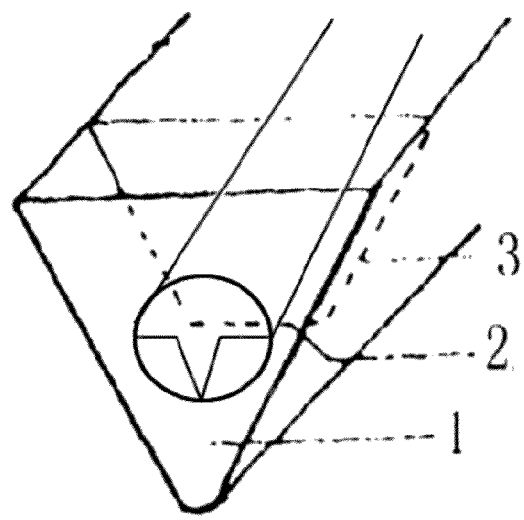
Figure 30:
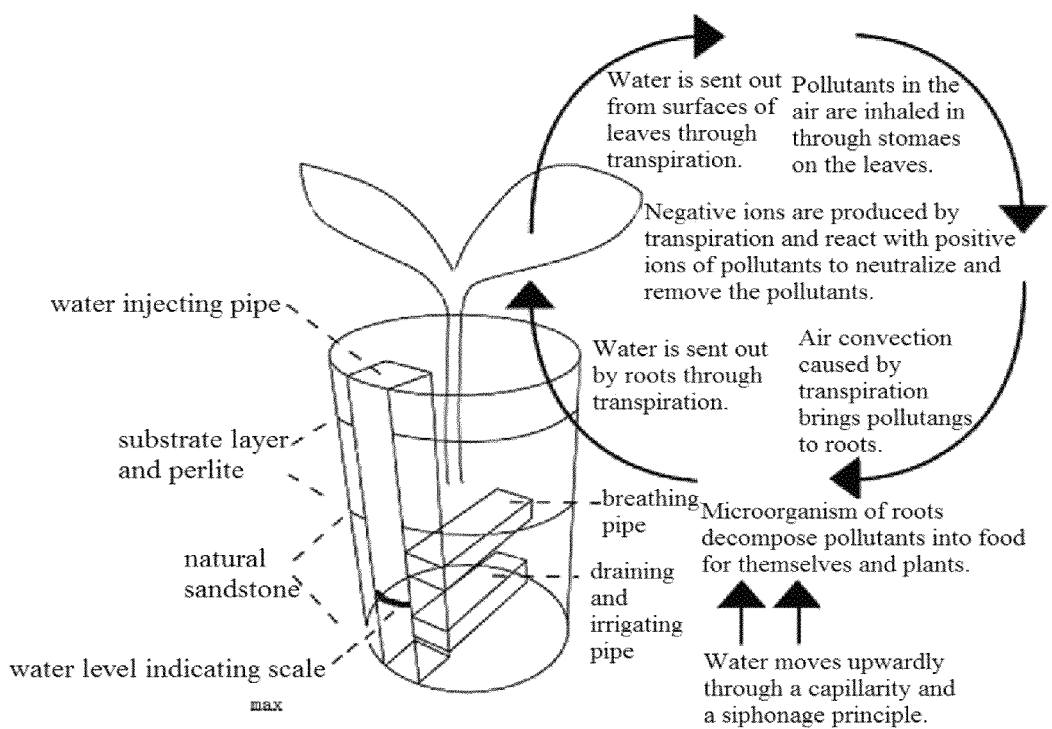
FIG. 30 is a sketch view of a basic structure and working principles of the present invention according to the seventh preferred embodiment of the present invention.

FIG. 29a shows a structure of a cultivating slot end of the environment-friendly and hermetic slot-typed substrate cultivating device.

1—fendering board of slot end; 2—cushioning comb; 3—insulating board of slot end; 4—draining and irrigating pipe

FIG. 30

Bringing Plants Back into the Nature

The environment-friendly and hermetic planting device with automatic draining and irrigating imitates a method of underground watering and makes use of a capillarity, a siphonage principle and transpiration of the plants. A nature-like environment is produced for the plants to breathe and absorb water freely.

Easy Plantation Without Trouble

Conventional planting pots always produce many problems which prevent many people interested in planting from trying. For example, too much water under the flowerpot may lead to too many mosquitoes; too much or too little water; too little space among the soil disables the plants to breathe freely; improper fertilization kills plants' roots. However, the environment-friendly and hermetic planting device with automatic draining and irrigating helps planters to know clearly about plants and to fertilize and water plants properly according to the left height of the water level below a boundary of an indicating scale. Nutrition in the soil is also kept instead of being flushed away by water in a conventional planting method, in such a manner that the water and the fertilizers are saved.

Water Injection

Please inject water at a top mouth of a "water injecting pipe" with a straw attached with a syringe.

During injecting, please watch the rising water level to make sure that the water level is below the sign of max on the "water level indicating scale".

Prevent the substrate layer from being immersed by water unless the substrate layer needs to be cleaned; or a mouth of a breathing hole of the "breathing pipe" can be sealed so that roots of plants may fail to breath the air and wither to death.

When injecting too much water, please directly suck water out with the straw attached with the syringe.

In order to product a nature-like environment for plants, please further inject water to a line 5 mm below the sign of max one day or several days after the plants soak up the water, in such a manner the plants are able to experience two states of moisture and aridity of the nature.

Plants Conservation

Fertilization; please dilute the fertilizer liquid with water according to a ratio of 1:100 when fertilizing plants; it is necessary to inject only 5 cc to 10 cc of diluted fertilizer liquid at the top mouth of the "water injecting pipe". In order to prevent the roots from withering to death because of direct absorption of too much fertilizer, frequent fertilizing with well diluted fertilizer is necessary. Fertilize Once per month, during an ordinary conservation period; fertilize once every two weeks or once every week, during a growth period or when preparing to hasten a flowering period. Forbid fertilization during the flowering period.

Reduce water to elongate roots; when the plants grow into some degree, reducing water injection allows the roots of the plants to grow downward to find water resource; when the growth of roots reaches expected goals, water injection should be recovered. Thus plants are able to absorb more water and fertilizers through elongated roots and have stronger ability to grow up. The draining and irrigating pipes are for wholly controlling moisture in the substrate layer. When necessary, even an exhaust fan put at a pipe mouth of the vertical water level indicating scale can be used for drying up the substrate.

Clean dejections of the substrate soil; plant roots deject some substances because of natural chemical reactions. Once half a year or once a year, the substrate of roots is cleaned by injecting a large amount of water through the "water injecting pipe" and immersing the substrate soil through the upper layer of draining and irrigating pipes. In order to avoid that tiny substrates are drained down to the sand layer for storing water to affect beauty, the water is drained out slowly by the lower layer of draining and irrigating pipes. Different from a filtrating geotextile, the draining and irrigating pipes do not block up, which is the most innovative advantage of the present invention.

What is claimed is:

1. An environment-friendly planting device with automatic percolation and irrigation of hermetic liquid, which is applied in places comprising indoor and outdoor walls, roofs, squares, playgrounds, hillsides, deserts, islands, warships, and space stations, for purposes comprising civil engineering, draining and irrigating and filtration, and fit for a single usage and a large-scale three-dimensional arrangement, wherein said device comprises a planting container and draining and irrigating pipes, wherein said planting container is orderly provided with a first layer comprising ceramic aggregates and sand, a second layer comprising medical stones, sand and perlites and an organic substrate layer from bottom to top; a water storage layer comprises said first layer and said second layer, or only the organic substrate; wherein said draining and irrigating pipe comprises a pipe body and a U-shaped draining and irrigating pipe inserted in and connected to said pipe body, wherein said pipe body comprises a round pipe having an end surface more than a semicircle and an open zone; convex bars are provided along an axial direction in an inner part of said pipe body; draining and irrigating holes are arranged at two sides of said U-shaped draining and irrigating pipe and have filtrating screens or no filtrating screen provided thereon; said U-shaped draining and irrigating pipe is inserted and connected between said convex bars and said open zone; a first draining and irrigating pipe having a U-shaped inner cavity is provided in an inner part of said first layer, and a second draining and irrigating pipe having a U-shaped inner cavity is provided as a snorkel in an inner part of said second layer, wherein an anti-insect lid is covering on a mouth of said snorkel of said second draining and irrigating pipe and has holes for breathing, two respective first ends of said first draining and irrigating pipe and said second draining and irrigating pipe and a vertical water inlet and breathing pipe are connected, two respective second ends thereof are sealed or connected to said vertical water inlet and breathing pipe, and a bottom of said water inlet pipe is sealed, wherein said water inlet pipe has a maximal water level marking or a float for indicating water level, wherein said maximal water level marking is below a bottom of said second draining and irrigating pipe; said organic substrate layer is for planting trees and flowers.

2. The environment-friendly planting device with automatic percolation and irrigation of hermetic liquid, as recited in claim 1, wherein said first end of said first draining and irrigating pipe in said planting container and said vertical water inlet and breathing pipe are connected, said second end thereof is sealed, or said second end thereof and a water level indicator are connected, wherein said water level indicator has markings of a maximal water level and a minimal water level; said second draining and irrigating pipe has said first end connected to said vertical snorkel and said second end sealed or connected to said vertical water inlet and breathing pipe.

3. The environment-friendly planting device with automatic percolation and irrigation of hermetic liquid, as recited in claim 2, wherein a flat arrangement comprises several said planting containers in series connection, wherein each first and second draining and irrigating pipe of each connected planting container is connected into a chain; a first planting container has a first vertical water inlet and breathing pipe and a last planting container has a water recycling box; a pump is provided in said water recycling box and connected to said first vertical water inlet and breathing pipe of said first planting container through pipelines.

4. The environment-friendly planting device with automatic percolation and irrigation of hermetic liquid, as recited in claim 2, wherein a three-dimensional arrangement comprises a three-dimensional tubular planting which comprises a three-dimensional shelf and tubular planting containers, wherein said tubular planting containers are in series connection from top to bottom and fixed on said three-dimensional shelf; each of said connected tubular planting container respectively has said first or second draining and irrigating pipe connected into a chain; a first tubular planting container has a first vertical water inlet and breathing pipe and a last tubular planting container has a water recycling box; a pump is provided in said water recycling box and connected to said first vertical water inlet and breathing pipe of said first tubular planting container through pipelines; planting holes or planting channels are arranged on surfaces of said tubular planting containers and have plants or flowers cultivated inside.

5. The environment-friendly planting device with automatic percolation and irrigation of hermetic liquid, as recited in claim 2, wherein said planting container comprises a plastic film cylinder or slot which is placed on or in a desert, wherein the plastic film cylinder has sand or other substrates in an inner part thereof and a layer for storing water at a lower part thereof; said draining and irrigating pipes are provided in the sand; ends of entrance and exit of said draining and irrigating pipes are higher than said layer for storing water therein; planting holes or slots are provided on said plastic film for cultivating plants and flowers therein.

6. The environment-friendly planting device with automatic percolation and irrigation of hermetic liquid, as recited in claim 2, wherein said device further comprises a solar panel or a wind generator, wherein said solar panels or said wind generators and a storage battery are connected, and said storage battery supplies electricity to said pump.

7. The environment-friendly planting device with automatic percolation and irrigation of hermetic liquid, as recited in claim 2, wherein said device further comprises a rainwater collecting and utilizing system which comprises a rainwater recycling box, said planting containers and an rain inductor, wherein said rainwater recycling box and water outfalls of said planting containers are connected; a float and a pump are provided in said rainwater recycling box, wherein water inlets of said planting containers are controlled by said float; a timer and said pump connects said rain inductor with said water inlet pipes of said planting containers.

8. The environment-friendly planting device with automatic percolation and irrigation of hermetic liquid, as recited in claim 1, wherein an overflow vent is provided at an end part of said first draining and irrigating pipe.

9. The environment-friendly planting device with automatic percolation and irrigation of hermetic liquid, as recited in claim 1, wherein a flat arrangement comprises several said planting containers in series connection, wherein each first or second draining and irrigating pipe of each connected planting container is connected into a chain; a first planting container has a first vertical water inlet and breathing pipe and a last planting container has a water recycling box; a pump is provided in said water recycling box and connected to said first vertical water inlet and breathing pipe of said first planting container through pipelines.

10. The environment-friendly planting device with automatic percolation and irrigation of hermetic liquid, as recited in claim 1, wherein a three-dimensional arrangement comprises a three-dimensional tubular planting which comprises a three-dimensional shelf and tubular planting containers, wherein said tubular planting containers are in series connection from top to bottom and fixed on said three-dimensional shelf; each of said connected tubular planting container respectively has said first or second draining and irrigating pipe connected into a chain; a first tubular planting container has a first vertical water inlet and breathing pipe and a last tubular planting container has a water recycling box; a pump is provided in said water recycling box and connected to said vertical first water inlet and breathing pipe of said first tubular planting container through pipelines; planting holes or planting channels are arranged on surfaces of said tubular planting containers and have plants or flowers cultivated inside.

11. The environment-friendly planting device with automatic percolation and irrigation of hermetic liquid, as recited in claim 1, wherein said planting container comprises a plastic film cylinder or slot which is placed on or in a desert, wherein the plastic film cylinder has sand or other substrates in an inner part thereof and a layer for storing water at a lower part thereof; said draining and irrigating pipes are provided in the sand; ends of entrance and exit of said draining and irrigating pipes are higher than said layer for storing water therein; planting holes or slots are provided on said plastic film for cultivating plants and flowers therein.

12. The environment-friendly planting device with automatic percolation and irrigation of hermetic liquid, as recited in claim 1, wherein said device further comprises a solar panel or a wind generator, wherein said solar panels or said wind generators and a storage battery are connected, and said storage battery supplies electricity to said pump.

13. The environment-friendly planting device with automatic percolation and irrigation of hermetic liquid, as recited in claim 1, wherein said device further comprises a rainwater collecting and utilizing system which comprises a rainwater recycling box, said planting containers and an rain inductor, wherein said rainwater recycling box and water outfalls of said planting containers are connected; a float and a pump are provided in said rainwater recycling box, wherein water inlets of said planting containers are controlled by said float; a timer and said pump connects said rain inductor with said water inlet pipes of said planting containers.

14. The environment-friendly planting device with automatic percolation and irrigation of hermetic liquid, as recited in claim 1, wherein a capillary moisture insulating layer and a filtrating layer of pumices or active carbons are orderly provided on said organic substrate layer of said planting container from bottom to top, wherein said capillary moisture insulating layer comprises sand or orchid stones, and a filtrating layer of pumices or active carbons.

* * * * *